(12) United States Patent
Sangavarapu et al.

(10) Patent No.: US 6,842,893 B1
(45) Date of Patent: Jan. 11, 2005

(54) METHOD FOR GLOBAL BREAKOUT IDENTIFICATION

(75) Inventors: Vamsi Krishna Sangavarapu, Bangalore (IN); Maneesh Soni, Bangalore (IN); Suparna Bhattacharya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 09/710,948

(22) Filed: Nov. 13, 2000

(51) Int. Cl.$^7$ .............................................. G06F 9/44
(52) U.S. Cl. .............................. 717/129; 717/124
(58) Field of Search ........................... 717/129, 124, 717/125, 168, 123, 128, 163

(56) References Cited

U.S. PATENT DOCUMENTS

| | | | | |
|---|---|---|---|---|
| 5,408,665 A | * | 4/1995 | Fitzgerald | 717/163 |
| 5,579,520 A | * | 11/1996 | Bennett | 717/151 |
| 5,790,861 A | * | 8/1998 | Rose et al. | 717/145 |
| 5,835,775 A | * | 11/1998 | Washington et al. | 717/153 |
| 5,881,288 A | * | 3/1999 | Sumi et al. | 717/125 |
| 5,892,921 A | * | 4/1999 | Murakami et al. | 709/234 |
| 6,256,646 B1 | * | 7/2001 | Starek et al. | 707/205 |
| 6,330,709 B1 | * | 12/2001 | Johnson et al. | 717/100 |
| 6,505,285 B1 | * | 1/2003 | Rabinovici et al. | 711/170 |
| 6,553,564 B1 | * | 4/2003 | Alexander et al. | 717/128 |
| 6,584,582 B1 | * | 6/2003 | O'Connor | 714/21 |

OTHER PUBLICATIONS

Rosenberg, Jonathan B., "How Debuggers Work: algorithm, data structure, and architecture", chapter 6 & 8, pp105–133, 151–172; John Wiley & Sons, Inc., 1996.*

Haban et al, Global Events & Global Breakpoints in Distributed Systems, System Sciences, 1988 Annual Hawaii Int'l Conf. vol. pp. 166–175.*

Rosenberg, Jonathan B., "How Debuggers Work: algorithm, data structure, and architecture" John Wiley & Sons, Inc., 1996.*

Rashid et al.,Robert Baron, Machine–independent virtual memory management for paged uniprocessor and multiprocessor architectures, Proceedings of the second international conference on Architectual support for programming languages and operating systems O.*

* cited by examiner

Primary Examiner—Tuan Dam
Assistant Examiner—Kuo-Liang J. Tang
(74) Attorney, Agent, or Firm—Anthony V. S. England; To Rao Coca; Manny Schecter

(57) ABSTRACT

A method, a computer-implemented apparatus, and a computer program product for identifying a global breakpoint for debugging computer software are disclosed. The method includes the step of representing the global breakpoint in software code using an identifier of an executable file and an offset in the executable file. Preferably, the file identifier is an inode of a Unix or Unix-like operating system.

36 Claims, 5 Drawing Sheets

METHOD FOR GLOBAL BREAKOUT IDENTIFICATION

FIELD OF THE INVENTION

The present invention relates to the debugging of software and computer programs and more particularly to the use of breakpoints in debugging processes.

BACKGROUND

Debugging is a process of detecting and locating errors or events in computer programs and other software with a view to eliminate such errors or events. Debugging may also involve the step of eliminating such errors. The debugging process is implemented using a debugger, which is a computer program or programs for detecting, tracing, and eliminating errors or events in computer programs, and other software. The latter are each referred to hereinafter as the "debugee".

A breakpoint is a point in a computer program or software where execution may be halted, normally at a place that is convenient for restarting execution of the program or software (i.e., the debugee) from that point. That is, breakpoints are events deliberately inserted or "planted" in a debugee by a debugger to receive control when the debugee reaches the certain point during execution of the debugee. At that point, the debugger needs access to the state of the debugee (perhaps with the ability to change that state), and either to resume or terminate execution of the debugee.

If a breakpoint is applicable only in the context of a specific process, the breakpoint is considered to be a local breakpoint. The same applies for plural breakpoints. Application debuggers generally use local breakpoints.

In contrast, global breakpoints are breakpoints active across all processes executing in a computer system, where two or more processes may use the same code segment. In other words, global breakpoints are applicable in all instances of a program or software code segment. If a global breakpoint event occurs, the debugger can instrument the debugged code irrespective of the process running that code. In this case, the concept of one debugee does not apply, and the target is not the process being debugged but the code that is being executed. Kernel-level debuggers and some code-instrumentation tools use global breakpoints, because the focus is on the code being debugged/instrumented and not on any specific process context.

Traditionally, breakpoints are specified by one of the following:

1) Virtual address,
2) Module, object, offset, and
3) Filename, line number.

Virtual Address

This is the most commonly used method to specify breakpoints. However, this method is not suitable for global breakpoints. In particular, global breakpoints cannot be specified using this method by virtual address because:

(1) the load address of some executable content cannot be determined before the executable content is loaded into memory; and
(2) some executable content (for example shared libraries in the Linux operating system) can be mapped at different virtual addresses in different processes. In the case of global breakpoints, this results in putting the same breakpoint at different virtual addresses for different processes. So, if a virtual address is used as the identification for global breakpoints, multiple identities exist for a single global breakpoint, each one being for different processes. Hence, this method is expensive and difficult to maintain as an identification for a global breakpoint.

Module, Object, Offset

The module, object, offset method is executable-file format dependent. The debugger must have necessary know-how about all the supported object formats, and the operating system (OS) must keep and make available this knowledge to the debugger.

Additionally, when the breakpoint is fired, OS support is required to enable the debugger to relate the virtual address of the breakpoint to the corresponding module, object and offset. Different operating systems may provide this support in different ways, which results in difficulties in implementing the global breakpoint concept for different operating systems.

The tool Dynamic Trace available on the OS/2 operating system uses this approach, but the approach is not applicable on other operating systems like Linux, where the kernel does not keep track of the executable file formats.

File, Line Number

The file, line-number approach is generally used in interactive application debuggers, but depends on the availability of relevant debugging information in the executable image. This approach requires the debugger itself to understand and use this knowledge, to relate the virtual address of the breakpoint to corresponding file name, line number when the breakpoint is hit. Some support from the OS is also needed to achieve this correlation. Executable images are not generally built with debugging information. Hence this method cannot be used to identify global breakpoints on generally available executable images.

Thus, a need clearly exists for an improved technique for identifying global breakpoints.

SUMMARY

In accordance with a first aspect of the invention, a method of identifying a global breakpoint for debugging computer software is disclosed. The method includes the step of representing the global breakpoint in code of the software using an identifier of an executable file and an offset in the executable file. The file identifier can be a file name. Preferably, the file identifier is an inode of a Unix or Unix-like operating system. Alternatively, the file identifier may be a file control block of a non-Unix operating system.

Preferably, the method further includes the step of resolving a virtual address of the code to the file identifier and the offset.

Optionally, the offset is obtained using symbol expressions.

Preferably, the method further includes the step of providing a hash list to look up the global breakpoint using the file identifier and the offset. Further, the method may include the step of maintaining the hash list of global breakpoints based on file identifiers and offsets.

Preferably, the method further includes the step of deriving the file identifier and the offset using a virtual address. The deriving step may be dependent upon information maintained by an operating system to map executable files to memory. Still further, the method may include the step of determining the file identifier and the offset from the virtual memory address for a memory mapped region. Two or more virtual addresses may exist for the software code. The global breakpoint may be contained in a private-per-process copy of a physical page of the software code.

In accordance with a second aspect of the invention, a computer-implemented apparatus for identifying a global breakpoint for debugging computer software is disclosed. The apparatus includes: a central processing unit for executing the computer software; memory for storing at least a portion of the computer software; and a device for representing the global breakpoint in code of the computer software using an identifier of an executable file and an offset in the executable file.

In accordance with a third aspect of the invention, a computer program product having a computer readable medium having a computer program recorded therein is disclosed for identifying a global breakpoint for debugging computer software. The computer program product includes a computer program code module for representing the global breakpoint in code of the computer software using an identifier of an executable file and an offset in the executable file.

BRIEF DESCRIPTION OF THE DRAWINGS

A small number of embodiments are described hereinafter, in which.

DETAILED DESCRIPTION

Figure 1:
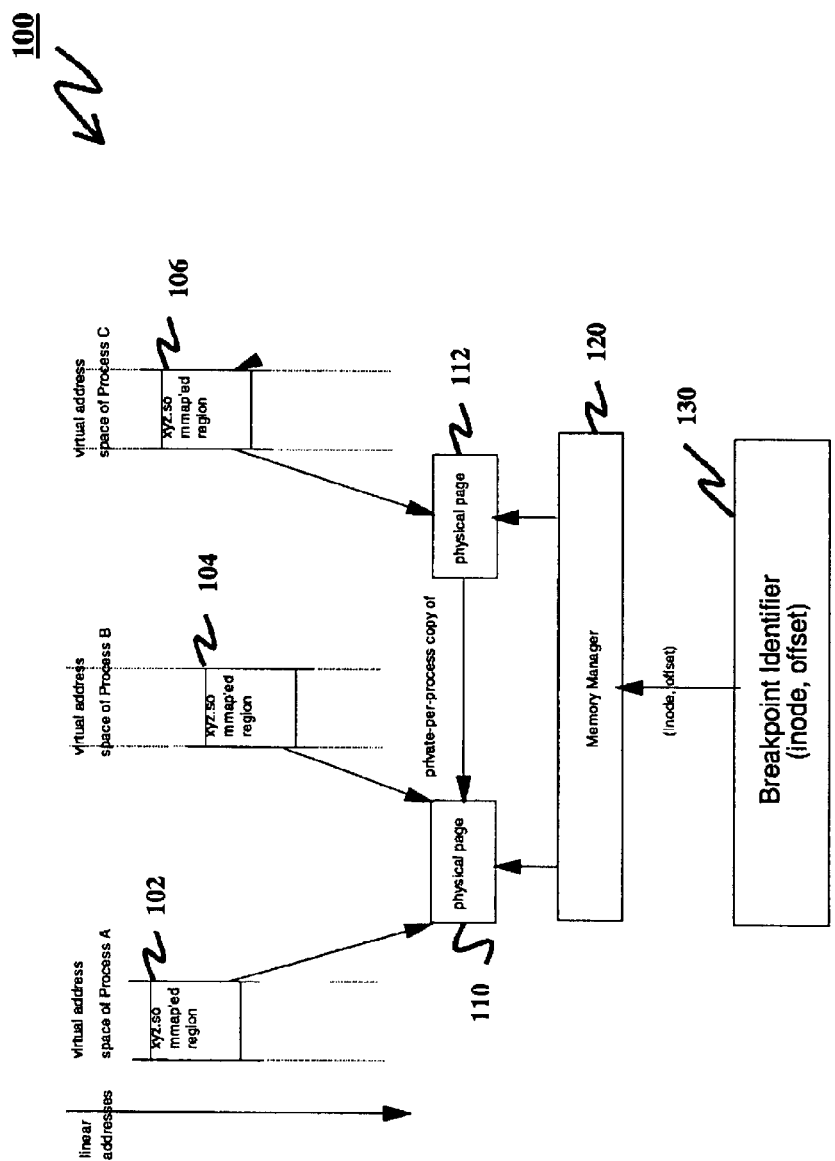
FIG. 1 is a block diagram illustrating the data structures and the function of modules of how a breakpoint location is uniquely identified in an executable file in accordance with the embodiments of the invention.

A method, an apparatus, and a computer program product are disclosed for identifying one or more global breakpoints for debugging computer software. In the following description, numerous details are set forth including particular operating systems. It will be apparent to one skilled in the art, however, that the present invention may be practiced without these specific details. In other instances, well-known features are not described in detail so as not to obscure the present invention.

In the following description, components of the global breakpoint identification system are described as modules. A module, and in particular its functionality, can be implemented in either hardware or software. In the software sense, a module is a process, program, or portion thereof that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

Overview

The preferred embodiment of the invention provides a method for specifying global breakpoints that satisfies the following requirements:

1. Easily identifies a breakpoint when a breakpoint exception is fired,
2. Is independent of image type and file format, and
3. Is independent of Operating System, as far as possible.

The preferred embodiment uses an inode and a file offset to denote and identify global breakpoints. The inode refers to the in-memory datastructure used by the operating system to identify uniquely a file on disk. The offset refers to the location of the instruction in the binary executable file, where the breakpoint is desired. On non-UNIX platforms, the equivalent of an inode, i.e. the file control block, can be used.

The invention may be practiced with Unix-like operating systems, as well as a number of non-Unix operating systems. The term "inode" can be generalised to a unique identifier for a file, which need not be persistent across system reboots. For operating systems such as SUN, HP, and AMx, for example, the file identifier may be the in-memory vnode. For Microsoft Windows NT™, the unique identifier may be a combination of a volume id and a reference file id.

The part that needs to be worked out separately for each OS is the way in which the OS maintains correlation between a virtual address in a process context, and the file and offset in the file which the virtual address is backed by or loaded from. Usually, where a form of memory mapped file mechanism is used for executables, this is likely to exist, as the OS needs to have some way to achieve this to service page-faults on memory mapped addresses.

This method depends on the ability of the operating system to resolve a code virtual address to the corresponding inode and offset of an executable file. This information is generally available and is the same information used by the OS to map executable content to memory.

There are three main aspects to breakpoint identification:
1) specifying the breakpoint,
2) managing breakpoint lists, and
3) identifying the breakpoint when the breakpoint exception fires.

Specifying a Global Breakpoint

A user can specify a global breakpoint using the executable (a program, shared library, etc.) file name and the offset in the file of the desired breakpoint instruction location. The offset in the file of the desired breakpoint location can be obtained by a number of methods. One technique is to use symbol expressions. Symbol locations can easily be determined in terms of file offsets using standard tools. The operating system can resolve the file name to a unique inode. Other techniques may be practiced without departing from the scope and spirit of the invention.

Managing Global Breakpoints

All global breakpoints are preferably maintained in a hash list based on inodes and offsets.

Identifying a Breakpoint

When a breakpoint exception is fired, the virtual address where the exception occurred is available from the operating system. The corresponding file inode, offset can be obtained from the virtual address using the information maintained by the OS to map executable files to memory.

FIG. 1 is a block diagram illustrating a structure 100 of how the file (inode, offset) uniquely identifies a breakpoint location in an executable file. FIG. 1 also shows that using (inode, offset), the different contexts can be arrived at in which a code page may be present.

As shown in FIG. 1, there are for example three processes A, B, and C to which a global breakpoint can be applied. The virtual address space of each process A, B, and C is shown.

In each of the virtual address spaces, there is a code segment 102, 104, 106 for memory mapped region of executable image file XYZ.SO. Also, the linear addresses are from top to bottom as indicated by the arrow.

The memory mapped regions 102 and 104 are mapped to the physical page 110 as indicated by respective arrows. In contrast, the memory mapped region 106 is mapped to the physical page 112, which is a private-per-process copy of physical page 110 as indicated by the arrow extending between the two. The breakpoint identifier 130 uses the inode of the executable image file XYZ.SO and the offset in that file to uniquely identify the breakpoint. Using the inode and the offset, the Memory Manager module 120 of the operating system kernel locates the physical page where the breakpoint instruction is actually implanted, including physical page 110 and the private-per-process copy 112 in the example of FIG. 1.

Advantages

The embodiments have a number of advantages. In particular, the debugger is freed from needing to know anything about the executable format. The method is universally applicable to all types of executables and also applicable to certain executable contexts (for example, shared libraries), which can be loaded at different virtual addresses in different processes. Further, the method does not require any additional debugging information to be present in the executable file. The method can even correctly identify breakpoints that happen to be on private-per-process code pages. Still further, the method can be used to specify breakpoints on executable content that is not yet loaded into memory.

Linux Specific Implementation Details

In the preferred embodiment, the method is used in a tool providing global breakpoint support in the Linux operating system. Specifically, the following describes how the information needed to specify a global breakpoint is obtained and how the breakpoint at a breakpoint exception is triggered or fired.

Figure 2:
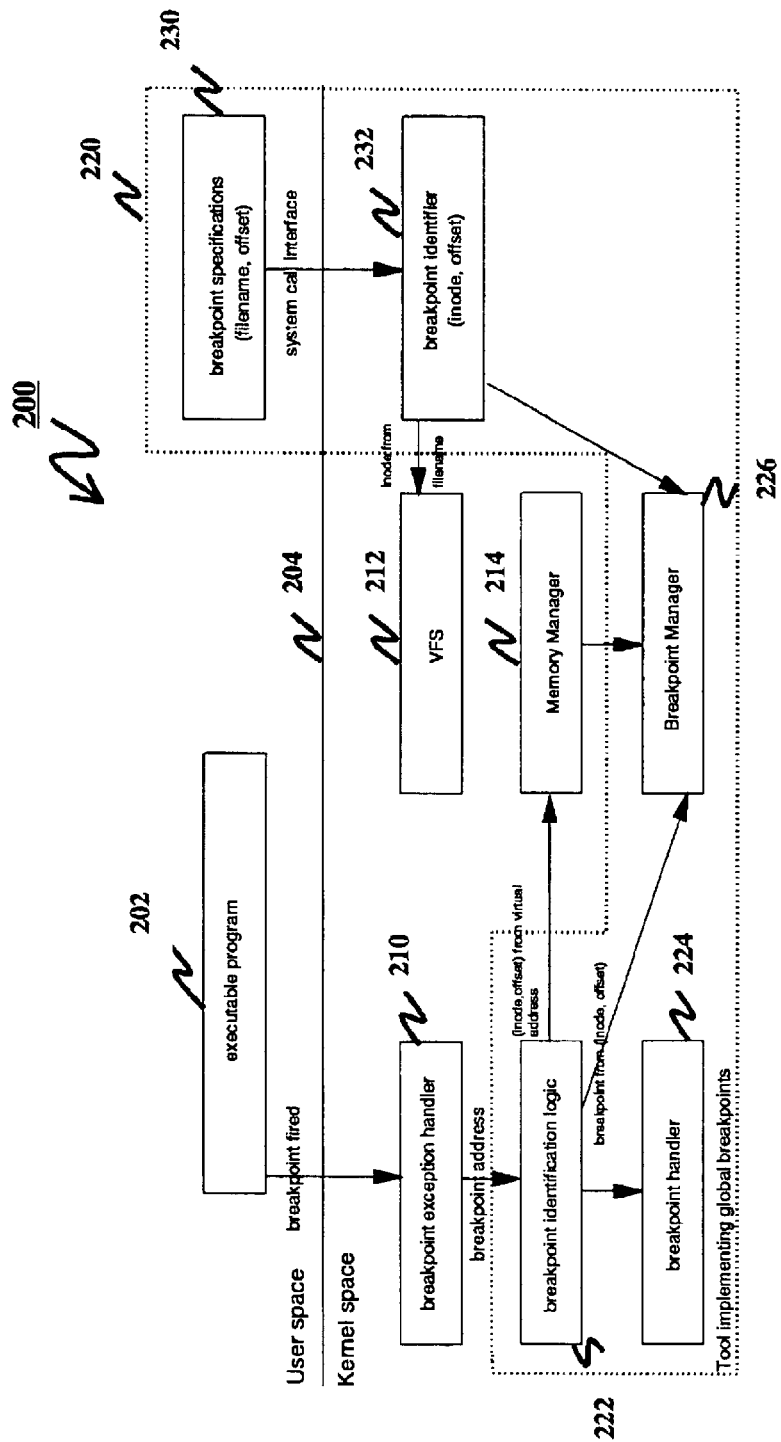
FIG. 2 is a block diagram illustrating a debugging tool implementing global breakpoints in accordance with the preferred embodiment of the invention.

FIG. 2 illustrates the tool 220, including the related modules and their interactions of the preferred embodiment. The environment 200 includes a user space and a kernel space, which is demarcated by the line 204. An executable program 202 exists in the user space and has a global breakpoint.

The tool 220 includes breakpoint identification logic 222, a breakpoint handler 224, a breakpoint manager 226, a breakpoint identifier (inode, offset) 232, and a breakpoint specification 230. The modules of the tool 220, except for the breakpoint specification 230, are in the kernel space. The breakpoint specifications 230 however are in the user space.

The kernel space also includes a breakpoint exception handler 210, a Virtual File System (VFS) module 212, and a Memory Manager module 214.

The breakpoint specifications 230 are provided by the user of the tool 220 in terms of the executable image filename and the offset within that file. The inode corresponding to the filename specified in 230, and thereby the breakpoint identifier 232, is obtained using the services of the VFS module 212 of the Linux kernel. Further details of the breakpoint specifications are provided in FIG. 3.

The breakpoint manager 226 maintains all the global breakpoints currently specified in a hash list data structure (not shown in FIG. 2). The hash function preferably takes the inode and offset as input to arrive at the hash key. The breakpoint manager 226 also maintains information about global breakpoints on per module (executable image) basis.

The firing of the global breakpoint is indicated by an arrow extending from the executable program or software 202 in the user space into the breakpoint exception handler 210 in the kernel space. The breakpoint exception handler 210 provides a virtual address of the breakpoint to the tool 220 implementing global breakpoints, and more particularly to a breakpoint identification logic 222. The breakpoint identification logic 222 communicates with the Memory Manager module 214 of the operating system kernel (as indicated by an arrow extending between the two modules) to obtain the inode and offset corresponding to the virtual address of the breakpoint. With this inode and offset, the breakpoint identification logic 222 then communicates with the Breakpoint Manager 226 to determine if there is a global breakpoint present at this virtual address. If so, the breakpoint identification logic module 222 then calls the breakpoint handler module 224 to handle the breakpoint. Further details of the breakpoint identification logic are provided in FIG. 4.

Specifying a Global Breakpoint

Reference is again made to the method of specifying a global breakpoint, described hereinbefore.

Figure 3:
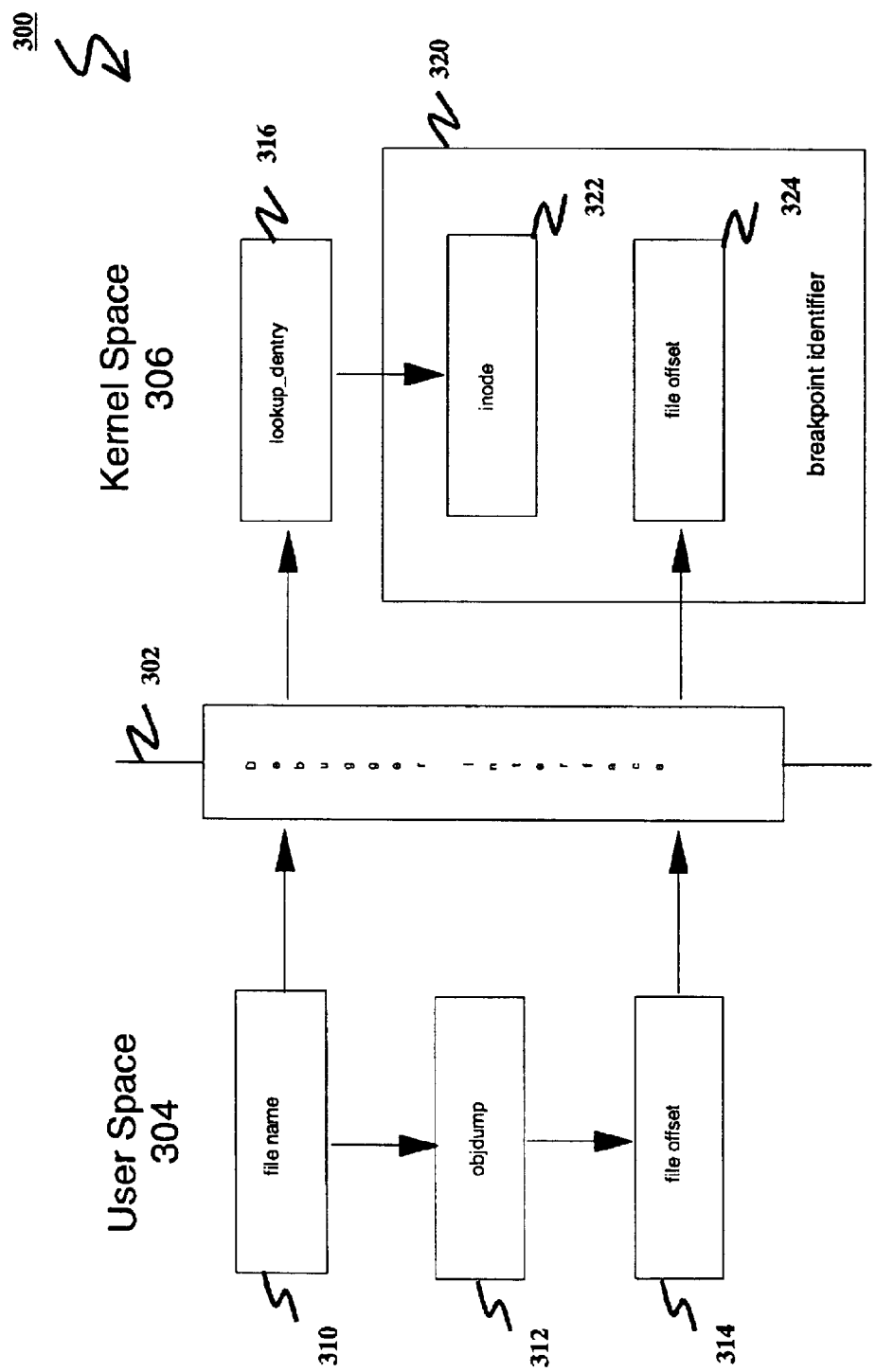
FIG. 3 is a block diagram illustrating the relationship between the user space and the kernel space to identify a global breakpoint via a debugger interface in accordance with the preferred embodiment of the invention.

The structure 300 of specifying global breakpoints is shown in detail in FIG. 3. In the user space 304, a file name 310 can be provided directly to the debugger interface 302. The file name here refers to the executable image file in which a global breakpoint is desired to be placed. The executable image file is provided to an objdump module 312. The objdump module can be used to obtain the offset 314 in the file where the global breakpoint is desired. This offset 314 along with the filename 310 is provided to the debugger interface 302. Instead of specifying the offsets to the debug interface 302, preferably, symbol expressions can be used. The debug interface 302 can then obtain the file offsets corresponding to these symbol locations using standard tools like objdump or nm.

In the kernel space 306, the file name 310 provided by the debugger interface 302 is provided to the lookup_dentry 316. The lookup_dentry 316 is part of the VFS (Virtual File System) module 212 of the operating system kernel which is used to determine the inode from the specified filename. The lookup_dentry 316 leads to the inode 322 of the breakpoint 320. Similarly, the offset 314 provided via the debugger interface 302 is used as the file offset 324 of the breakpoint identifier 320.

Thus, from the user specification of a global breakpoint, the identifier of the breakpoint can be obtained in terms of the file inode and offset.

Managing Global Breakpoints

Preferably, all the global breakpoints currently specified are managed in a hash list data structure. The hash function preferably takes the inode and offset as input to arrive at the hash key. This is required for easy identification of a breakpoint when the breakpoint is fired. Information about global breakpoints are also maintained on a per-module (executable image) basis. The per module structures in turn are arranged in a global linked list.

Identifying a Breakpoint

When a breakpoint exception is fired, the virtual address where the exception occurred is available from the kernel (pt_regs structure). The pt_regs structure contains all the contents of the central processing unit (CPU) specific registers at the time of breakpoint exception. One of the fields of the pt_regs structure called eip, on Intel platforms, is the program counter, which contains the virtual address where the exception occurred.

The corresponding file inode, offset can be obtained from the virtual address as follows:

1. From the virtual address, the Virtual Memory Area (VMA) is obtained using the find_vma function provided by the Memory Manager module 214 of the Linux Kernel) representing the region in which the virtual address is present, in the context of the current address space; and
2. The VMA has the file inode and starting offset in the file backing the region, when this VMA represents a memory mapped region (as is the case for executable content).

With the file inode and offset of the breakpoint exception location, the breakpoint is identified and can be looked up in the hash list described hereinbefore.

Figure 4:
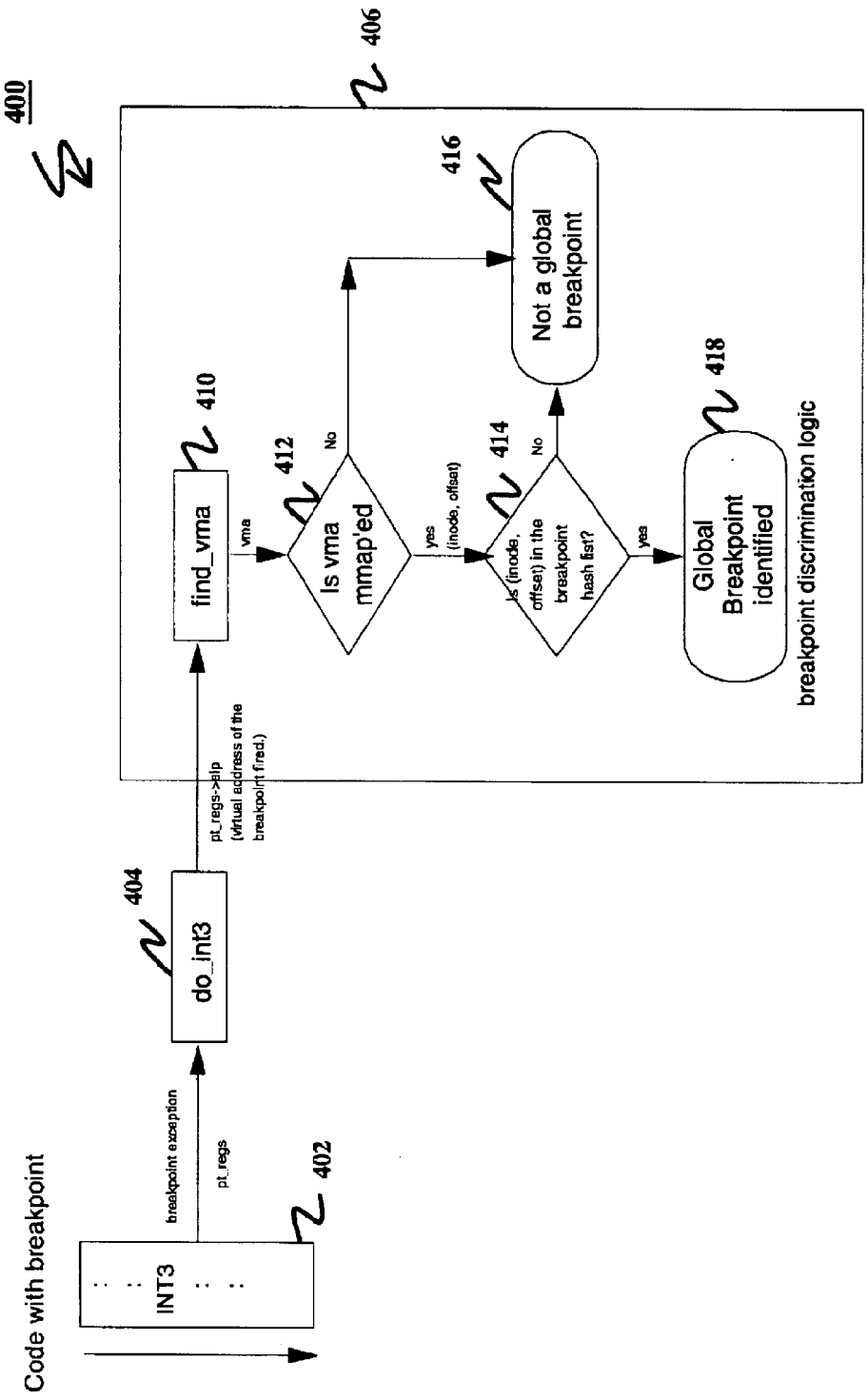
FIG. 4 is a flow diagram illustrating a process for identifying a global breakpoint that is looked up in a hash list in accordance with the preferred embodiment of the invention.

FIG. 4 illustrates the process 400 of identifying a global breakpoint in accordance with the preferred embodiment. The code 402 containing a breakpoint is shown in FIG. 4. When the interrupt INT3 is reached, a breakpoint exception is generated and provided to the do_INT3 module 404. The do_int3 404 module is the part of the Linux Kernel that handles the breakpoint exception on Intel Platforms. This module 404 obtains the state of all the CPU hardware registers at the time the breakpoint is fired from the pt_regs structure passed to the module 404. The eip field in the pt_regs structure contains the virtual address where the breakpoint is fired. This is provided to the breakpoint discrimination logic 406. The logic 406 includes steps 410–418.

In step 410 of logic 406, the find_vma module 410, which is part of the Memory Manager module 214 of the Linux Kernel, determines the VMA where the breakpoint is fired. The VMA is provided to decision step 412. In decision step 412, a check is made to determine if the VMA is memory mapped. If decision step 412 returns false (no), this instance of the breakpoint exception does not correspond to a global breakpoint 416, as indicated by block 416. Otherwise, if decision block 412 returns true (yes), processing continues at decision step 414. The parameters (inode, offset) are provided to decision step 414. In decision step 414, a check is made to determine if (inode, offset) is in the breakpoint hash list. If decision block 414 returns false (no), this instance of the breakpoint exception does not correspond to a global breakpoint, as indicated by block 416. Otherwise, if decision block 414 returns true (yes), a global breakpoint 418 is identified.

As the foregoing embodiments illustrate, using the file inode and offset to denote a global breakpoint is a universally applicable method and can be elegantly implemented.

The embodiments of the invention are preferably implemented using a general-purpose computer. In particular, the processing or functionality of FIGS. 1–4 can be implemented as, software, or a computer program, executing on the computer. The method or process steps for identifying one or more global breakpoints for debugging computer software are effected by instructions in the software that are carried out by the computer. The software may be implemented as one or more modules for implementing the process steps. A module is a part of a computer program that usually performs a particular function or related functions. Also, as described hereinbefore, a module can also be a packaged functional hardware unit for use with other components or modules.

In particular, the software may be stored in a computer readable medium, including the storage devices described below. The software is preferably loaded into the computer from the computer readable medium and then carried out by the computer. A computer program product includes a computer readable medium having such software or a computer program recorded on it that can be carried out by a computer. The use of the computer program product in the computer preferably effects advantageous apparatuses for identifying one or more global breakpoints for debugging computer software.

Figure 5:
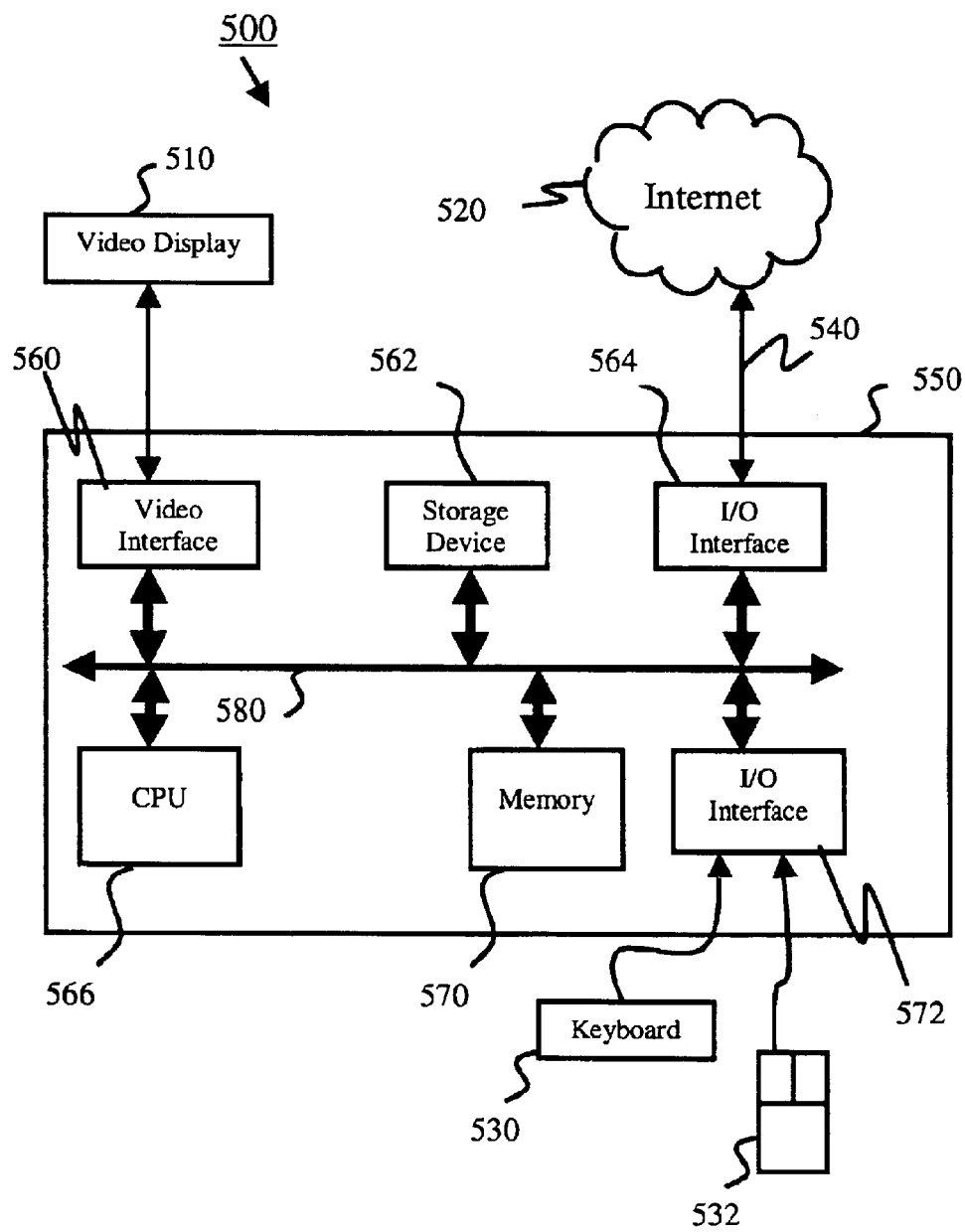
FIG. 5 is a block diagram illustrating a general purpose computer, with which embodiments of the invention can be practiced.

Preferably, a computer system 500 shown in FIG. 5 includes the computer 550, a video display 510, and input devices 530, 532. In addition, the computer system 500 can have any of a number of other output devices including line printers, laser printers, plotters, and other reproduction devices connected to the computer 550. The computer system 500 can be connected to one or more other computers via a communication interface using an appropriate communication channel 540 such as a modem communications path, a computer network, or the like. The computer network 520 may include a local area network (LAN), a wide area network (WAN), an Intranet, and/or the Internet.

The computer 500 itself preferably includes a central processing unit(s) 566 (simply referred to as a processor hereinafter), a memory 570 which may include random access memory (RAM) and read-only memory (ROM), input/output (IO) interfaces 564, 572, a video interface 560, and one or more storage devices 562. The storage device(s) 562 can include one or more of the following: a floppy disc, a hard disc drive, a magneto-optical disc drive, CD-ROM, magnetic tape or any other of a number of non-volatile storage devices well known to those skilled in the art. Each of the components is typically connected to one or more of the other devices via a bus 580 that in turn can consist of data, address, and control buses.

The video interface 560 is connected to the video display 510 and provides video signals from the computer for display on the video display 510. User input to operate the computer can be provided by one or more input devices 530, 532. For example, an operator can use a keyboard 530 and/or a pointing device such as the mouse 532 to provide input to the computer.

The foregoing system is simply provided for illustrative purposes and other configurations can be employed without departing from the scope and spirit of the invention. Computers with which the embodiment can be practiced include IBM-PC/ATs or compatibles, one of the Macintosh™ family of PCs, Sun Sparcstation™, a workstation or the like. The foregoing are merely examples of the types of computers with which the embodiments of the invention may be practiced. Typically, the processes of the embodiments, are resident as software or a program recorded on a hard disk drive as the computer readable medium, and read and controlled using the processor. Intermediate storage of the program and intermediate data and any data fetched from the network may be accomplished using the semiconductor memory, possibly in concert with the hard disk drive.

In some instances, the program may be supplied to the user encoded on a CD-ROM or a floppy disk, or alternatively could be read by the user from the network via a modem device connected to the computer, for example. Still further, the software can also be loaded into the computer system from other computer readable medium including magnetic tape, a ROM or integrated circuit, a magneto-optical disk, a radio or infra-red transmission channel between the computer and another device, a computer readable card such as a PCMCIA card, and the Internet 520 and Intranets including email transmissions and information recorded on websites and the like. The foregoing are merely examples of relevant computer readable mediums. Other computer readable mediums may be practiced without departing from the scope and spirit of the invention.

Finally, while the preferred embodiment is implemented using the Linux operating system, it will be appreciated by those skilled in the art in view of this disclosure that the invention can be practiced with other Unix or Unix-like operating systems and with a number of non-Unix operating systems.

In the foregoing manner, a method, an apparatus, and a computer program product for identifying global breakpoints for debugging computer software. While only a small number of embodiments are described, it will be apparent to those skilled in the art in view of this disclosure that numerous changes and/or modifications can be made without departing from the scope and spirit of the invention.

What is claimed is:

1. A method of identifying a global breakpoint for debugging computer software, said method including the steps of:
   receiving a file name for an executable image file, wherein the executable image file is loaded in memory of a computer system and the global breakpoint is to be placed in the image for executing by the computer system;
   receiving a symbol expression for a location in the executable image file where the global breakpoint is to be placed;
   passing the symbol expression and the file name to a first operating system module running on the computer system;
   receiving a file offset corresponding to the symbol location from the first operating system module;
   passing the file name for the executable image file to a second operating system module;
   receiving a file identifier from the second operating system module, wherein the file identifier is used by the operating system for uniquely identifying the executable file in the computer system memory; and
   representing said global breakpoint in code of said software using the received file identifier of the executable image file and the received offset in said executable file.

2. The method according to claim 1, wherein said file identifier is a file name.

3. The method according to claim 1, wherein said file identifier is an inode of a Unix operating system.

4. The method according to claim 1, wherein said file identifier is a file control block of a non-Unix operating system.

5. The method according to claim 1, further including the step of resolving a virtual address of said code to said file identifier and said offset.

6. The method according to claim 1, further including the step of providing a hash list to look up said global breakpoint using said file identifier and said offset.

7. The method according to claim 6, further including the step of maintaining said hash list of global breakpoints based on file identifiers and offsets.

8. The method according to claim 1, further including the step of deriving said file identifier and said offset using a virtual address.

9. The method according to claim 8, wherein said deriving step is dependent upon information maintained by an operating system to map executable files to memory.

10. The method according to claim 8, further including the step of:
    determining file identifier and said offset from said virtual address for a memory mapped region.

11. The method according to claim 8, wherein two or more virtual addresses exist for said software code.

12. The method according to claim 1, wherein said global breakpoint is contained in a private-per-process copy of a physical page of said software code.

13. A computer-implemented apparatus for identifying a global breakpoint for debugging computer software, said apparatus including:
    a central processing unit for executing said computer software;
    memory for storing at least a portion of said computer software;
    means for receiving a file name for an executable image file, wherein the executable image file is loaded in memory of a computer system and the global breakpoint is to be placed in the image for executing by the computer system;
    means for receiving a symbol expression for a location in the executable image file where the global breakpoint is to be placed;
    means for passing the symbol expression and the file name to a first operating system module running on the computer system;
    means for receiving a file offset corresponding to the symbol location from the first operating system module;
    means for passing the file name for the executable image file to a second operating system module;
    means for receiving a file identifier from the second operating system module, wherein the file identifier is used by the operating system for uniquely identifying the executable file in the computer system memory; and
    means for representing said global breakpoint in code of said computer software using the received file identifier of the executable image file and the received offset in said executable file.

14. The apparatus according to claim 13, wherein said file identifier is a file name.

15. The apparatus according to claim 13, wherein said file identifier is an inode of a Unix operating system.

16. The apparatus according to claim 13, wherein said file identifier is a file control block of a non-Unix operating system.

17. The apparatus according to claim 13, further including means for resolving a virtual address of said code to said file identifier and said offset.

18. The apparatus according to claim 13, further including a hash list to look up said global breakpoint using said file identifier and said offset.

19. The apparatus according to claim 18, further including means for maintaining said hash list of global breakpoints based on file identifiers and offsets.

20. The apparatus according to claim 13, further including means for deriving said file identifier and said offset using a virtual address.

21. The apparatus according to claim 20, wherein said deriving means is dependent upon information maintained by an operating system to map executable files to memory.

22. The apparatus according to claim 20, further including means for determining said file identifier and said offset from said virtual memory address for a memory mapped region.

23. The apparatus according to claim 20, wherein two or more virtual addresses exist for said software code.

24. The apparatus according to claim 13, wherein said global breakpoint is contained in a private-per-process copy of a physical page of said software code.

25. A computer program product having a computer readable medium having a computer program recorded therein for identifying a global breakpoint for debugging computer software, said computer program product including:

computer program means for receiving a file name for an executable image file, wherein the executable image file is loaded in memory of a computer system and the global breakpoint is to be placed in the image for executing by the computer system;

computer program means for receiving a symbol expression for a location in the executable image file where the global breakpoint is to be placed;

computer program means for passing the symbol expression and the file name to a first operating system module running on the computer system;

computer program means for receiving a file offset corresponding to the symbol location from the first operating system module;

computer program means for passing the file name for the executable image file to a second operating system module;

computer program means for receiving a file identifier from the second operating system module, wherein the file identifier is used by the operating system for uniquely identifying the executable file in the computer system memory; and computer program code means for representing said global breakpoint in code of said computer software using the received file identifier of the executable image file and the received offset in said executable file.

26. The computer program product according to claim 25, wherein said file identifier is a file name.

27. The computer program product according to claim 25, wherein said file identifier is an inode of a Unix operating system.

28. The computer program product according to claim 25, wherein said file identifier is a file control block of a non-Unix operating system.

29. The computer program product according to claim 25, further including computer program code means for resolving a virtual address of said code to said file identifier and said offset.

30. The computer program product according to claim 25, further including computer program code means for providing a hash list to look up said global breakpoint using said file identifier and said offset.

31. The computer program product according to claim 30, further including computer program code means for maintaining said hash list of global breakpoints based on file identifiers and offsets.

32. The computer program product according to claim 25, further including computer program code means for deriving said file identifier and said offset using a virtual address.

33. The computer program product according to claim 32, wherein said computer program code means for deriving is dependent upon information maintained by an operating system to map executable files to memory.

34. The computer program product according to claim 32, further including computer program code means for determining said file identifier and said offset from said virtual memory address for a memory mapped region.

35. The computer program product according to claim 32, wherein two or more virtual addresses exist for said software code.

36. The computer program product according to claim 25, wherein said global breakpoint is contained in a private-per-process copy of a physical page of said software code.

* * * * *